March 30, 1954     H. L. SHAW     2,673,748
ROTARY CONNECTION
Filed Jan. 19, 1949
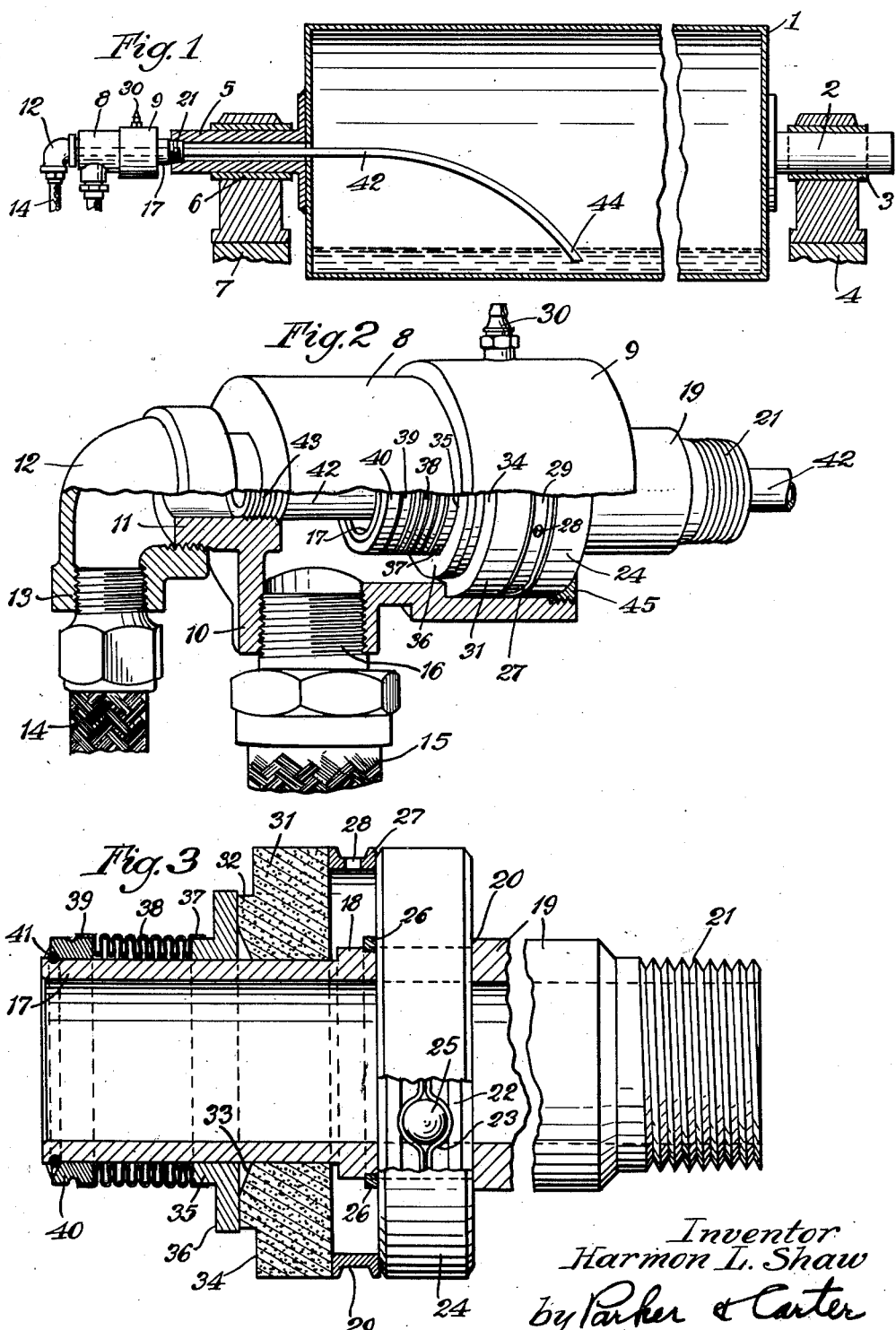
Inventor
Harmon L. Shaw
by Parker & Carter
Attorneys.

Patented Mar. 30, 1954

2,673,748

UNITED STATES PATENT OFFICE 2,673,748

ROTARY CONNECTION

Harmon L. Shaw, Mokena, Ill., assignor to Perfecting Service Company, Chicago, Ill., a firm Application January 19, 1949, Serial No. 71,718

4 Claims. (Cl. 285—9)

This invention relates to a connection or fitting and particularly to a connection which provides a connection through a support which is intended to be rotated. It has for one object to provide a fluid-tight seal by means of which fluid may be introduced and withdrawn from a member which is to be rotated, and one object of the invention is, therefore, to provide such a connection or joint and to arrange it so that it is fluid-tight and so that one or more fluid connections may be made through the joint. In some cases fluid is merely introduced through the joint and in other cases it may be introduced and withdrawn, and it is an object of the invention to provide a device capable of accomplishing this result.

A further object of the invention is to provide a sealing member effective in all conditions of temperature and pressure and for a wide variety of types of fluid to accomplish satisfactory and continuous sealing.

Other objects will appear from time to time throughout the specification and claims.

This invention is illustrated more or less diagrammatically in the accompanying drawings, wherein:

Figure 1 is a vertical cross section through a device to which the rotary connection of the present invention can be applied;

Figure 2 is a section showing the rotary connection of Figure 1 on an enlarged scale; and Figure 3 is a section with parts in elevation illustrating the sealing assembly of the rotary connection of Figure 2.

Like parts are indicated by like characters throughout the specification and the drawings.

The device of this invention can be conveniently used as a joint through which fluid is supplied to a moving part, such as a drum, and may also be embodied in the structural means for withdrawing fluid. The structure illustrated in Figure 1 shows diagrammatically the means for supplying steam to a drum and for withdrawing condensed liquid from the drum.

As shown in Figure 1, a steam type drum 1 is provided with a trunnion 2 carried in a bearing 3 supported on a base 4. At its opposite end the drum 1 is carried by a hollow trunnion 5 in a bearing 6 supported from a base 7. The invention is not limited to the application of any particular type of drum or to any particular type of bearing or support for the drum, and the structure illustrated in Figure 1 is in that respect merely illustrative of one possible use of the present device.

The rotary connection, joint or fitting comprises a hollow housing 8 which is enlarged at 9. A threaded connecting portion 10 is preferably formed integrally with the housing 8. The end portion 11 of the housing 8 may be closed if return flow of fluid is not to be provided. If return flow of fluid is to be provided an elbow 12 is fixed to the portion 11 and may terminate in a threaded member 13. The return flow of fluid is accomplished through a conduit 14 which is fixed to the portion 13. The inflow of fluid is accomplished through a conduit 15 which is connected to the portion 10 by a threaded nipple 16. The conduits 14 and 15 may conveniently be made flexible, although they may also be rigid. As shown they are diagrammatically indicated as being formed of a flexible material.

Mounted for rotation within the housing 8, 9 is a generally tubular fluid path member 17. As shown this member is enlarged at 18 and further enlarged at 19, a shoulder 20 being formed between the sections 18 and 19. At one end adjacent the portion 19 the member 17 is threaded, as at 21, for engagement with corresponding threading in the hollow trunnion 5.

Mounted on the portion 18 and preferably abutting the shoulder 20 is an anti-friction bearing. As shown this bearing comprises an inner race 22, a ball cage 23 and an outer race 24. Balls 25 are positioned within the cage 23. The invention is not limited to the use of anti-friction bearings, and the one illustrated is merely typical of a suitable bearing for the present device. The inner race 22 is secured to the member 17 in any desired manner, for example, by a key or keys 26, as shown in Figure 3.

Positioned adjacent the outer bearing race 24 is a ring 27 which is provided with one or more perforations 28. The ring as shown is provided with a peripheral groove or reduced portion 29 within which the perforation 28 is positioned. The housing 9 is provided with a connection member 30 through which lubricant may be discharged into the groove 29, and from this groove 29 the lubricant will pass into the space within the ring 27 and will thus reach the ball bearing.

Positioned about the member 17 and abutting against one face or edge of the ring 27 is a sealing ring 31. As shown this ring is provided on one face with a projection 32 which is tapered, as at 33, and it is also provided with a shoulder portion 34. It is preferably formed of a metal alloy impregnated with graphite. This member is ground and polished, and it forms a satisfactory sealing and bearing ring.

Positioned about the member 17 and against the portion 32 of the sealing ring 31 is a ring-like member 35. As shown this portion is tubular and closely embraces the member 17. It is provided with a laterally disposed flange or fluid pressure face 36 which bears against the portion 32 of the ring 31. It serves also as a seat for one end 37 of an enclosed spring-sealing member or bellows 38 which is positioned, as shown particularly in Figure 3, about the member 17. At its opposite end, as at 39, the spring-sealing member 38 is seated upon a ring 40 which is positioned upon the member 17 and is held in place by a locking ring or other locking member 41. The member 38 serves as a sealing member. Its ends 37 and 39 are fixed, respectively, to the portions 35 and 40 and are sealed to them so that fluid cannot pass therethrough and fluid pressure acts only on the exterior surface of the member 38. The member 38 is also a spring member and it is so shaped and is formed of such material that it exerts of itself sufficient force upon the member 35, 36 to initially force it into fluid-sealing engagement with the portion 32 of the sealing ring 31. It operates to accomplish this purpose irrespective of the pressure to which it may be subjected as fluid passes into and through the housing 8.

When the system is to be used not merely for introducing fluid into the drum but also for withdrawing it, the elbow 12 and the conduit 14 are attached as shown in Figures 1 and 2. In addition to that, a tubular member 42 is inserted through the member 17. It is of such size that it occupies only a portion of the space within the member 17 and is out of contact with that member. At one end the tubular member 42 is threaded, as at 43, and is received in corresponding threading in the housing member 8. At its other end the member 42 is preferably downwardly bent, as at 44, to reach that portion of the drum 1 in which condensed fluid will be held and thus the tube 42 is in position to withdraw condensate from the drum. The assembly above described is held in place by a lock ring 45 shown in Figure 2.

The structure above described may or may not include any of the following features: The member 30 is a fitting through which grease or other lubricant may be discharged into the union and particularly into the space beneath the ring 27. Preferably, although not necessarily, this fitting is provided with relief means so that as the temperature increases the pressure increase which results may escape through the fitting and thus undue forces upon the bearing or other parts of the fitting as a result of this temperature increase are prevented.

The sealing ring 31 has been described above as being formed of a metal alloy impregnated with graphite. It might equally well be made entirely of graphite in the form of a non-porous, resin bonded dense carbon member. It is basically a self-lubricating, non-porous member. It might be of pure metal and might include no carbon. As shown it is shaped or chamfered on one face as at 33. When the exposed surface of the portion 32 wears as a result of contact with the flange 36, the sealing area becomes greater and thereby slows down the wearing process. The sealing surface may be considered as comprising a raised shoulder such as the portion 32 of a softer material than the overlapping contacting surface of the member 36, and thus any wear which occurs between these two members is taken by the softer material of the member 31, and the face 36 tends to wipe off all foreign matter from the sealing surfaces in the manner in which a "squeegee" operates.

As this occurs no groove is formed to permit the lodgement of foreign matter or to break the sealing effect between the surfaces. In operation a very minute film of the fluid which passes through the connection—that is to say, through the member 17 and through the interior of the housing 8—forms on the sealing surfaces between the members 32 and 36 and acts as a lubricant. This film also cuts down wear and reduces the frictional drag, but the film is not of sufficient size to permit appreciable fluid to pass between the sealing surfaces 32 and 36. The ring 31, however formed, may be held fixed in the housing portion 9 within which it is positioned, or it may float.

The bellows 38 need not be formed of any particular metal. It is convenient to form it of Monel metal, and it is so shaped and proportioned that no added spring is required. It acts as its own spring as well as a sealing member, and it gives an initial loading to the sealing surfaces where the members 32 and 36 contact. The effect of the bellows in response to pressure variations upon its surface is also to vary the pressure on the sealing faces automatically in porportion to the increase or decrease of fluid pressure of the medium which passes through the union. This is accomplished by the mean effective area relationship between the bellows and the sealing face of the member 36. The external pressure on the bellows would tend to collapse the bellows, but the extended area of the sealing face of the member 36 overbalances the effective area which would tend to collapse the bellows.

Although I have shown an operative form of my invention, it will be recognized that many changes in the form, shape and arrangement of parts can be made without departing from the spirit of the invention, and my showing is, therefore, to be taken as, in a sense, diagrammatic.

It is to be noted that fluid flows through the connection from left to right in the drawings, through the fluid path member 17 and this fluid also exerts pressure upon the exterior of the bellows 38 and upon the flange or pressure face 36 of the ring 35. It will, thus, be noted that the bellows 38 is in the fluid column but is not a fluid passage member and fluid pressure does not act upon the inner surface of the bellows, but acts only on the exterior surface. If fluid pressure were permitted to act upon the inner surface of the bellows 38, such pressure would tend to expand or elongate the bellows 38, causing increased friction between the members 38 and 32 and failure under high speed or high pressure operation. The spring member or bellows 38 must be of the enclosed type to prevent the flow of fluid therethrough, otherwise, there would be leakage between the ring 35 and the path member 17 and an effective seal would not be provided.

The present arrangement accomplishes a constant fluid seal under various pressures and with a minimum of friction. It is particularly effective under operating conditions involving high speed and high pressure and wherein friction must be maintained at the lowest possible level.

This balanced seal is effected at least in part by operation of the fluid pressure itself upon the flange 36. The bellows 38 is provided with sufficient spring tension to exert an initial sealing pressure against the ring member 35. This alone is sufficient for low pressure operation. However, upon increased fluid pressure acting upon the exterior surface of the bellows 38, the bellows 38 tends to contract or collapse which, if not compensated for or overcome, would cause leakage between the members 35 and 34. The pressure face or flange 36 is provided to overcome the tendency of the bellows 38 to collapse upon increased exterior pressure and to further provide a balanced seal between the member 35 and the member 34. This is accomplished by fluid pressure acting upon the pressure face or flange 36 and urging the same into sealing engagement with the shoulder 32 of the member 34. It will be observed in Figure 3 that the closed end of the bellows convolution adjacent the ring 35 is positioned adjacent the inner periphery of the ring 35, thus, permitting fluid pressure to act upon substantially the entire lefthand surface of the ring 35, the inner left-hand face of the ring 35 acting as a fluid pressure face as well as the flange 36.

Thus, as fluid pressure increases, the pressure against the face 36 increases which compensates and overcomes the tendency of the bellows to collapse and provides a more constant sealing pressure between the member 36 and the shoulder 32 of the member 34. Since this force increases in direct proportion to the fluid pressure and is, in turn, balanced or counteracted by the bellows 38, the sealing pressure remains more or less constant and in balance. In practice, it has been found that upon increasing fluid pressure, a gradual increase in driving horsepower is required up to a certain point, at which the horsepower requirement remains substantially constant and, eventually tends to show a small decrease, as the fluid pressure continues to increase. Thus, friction is reduced and a substantial power saving is realized, together with longer life for the connection.

The use and operation of this invention are as follows:

The device in the form shown is associated with a rotating member, and it is arranged to be connected to the interior of that member through a bearing which supports the rotating member. It provides a constant seal which is accomplished in part by the member 38 which is both a sealing and a pressure means and which therefore acts as a partition to prevent the undesired entrance of fluid into the bearing structure, and it also serves as its own spring member to maintain constantly the proper degree of pressure on the other sealing elements to insure their satisfactory operation and to prevent leakage past them.

In ordinary use a gas or vapor such as steam will be discharged through the conduit 15 and will pass into the housing portion 8. It will move then through the member 17 into the interior of the drum 1. If the device is arranged to withdraw condensate, the connection 12 and the conduit 14 will be installed as shown and the tube 42 will also be installed. Since the lower end of the tube 42 is directed to the bottom of the drum 1, it will come in contact with condensate, and if proper suction is exerted through the conduit 14, this condensate will be withdrawn through the tube 42 and discharged away from the drum.

It is recognized that under many conditions of operation no suction need be applied to the conduit 14. The steam pressure or other gas or vapor pressure within the drum may be sufficient of itself to cause the condensate to be carried outwardly through the tube 42, and the invention is therefore not limited to the use of suction to withdraw the condensate.

Whether the device be embodied in a complete union which provides for the withdrawal of condensate or which provides merely for the introduction of fluid, the operation of the sealing features is substantially the same, and no change in the structure shown in Figure 3 is required.

I claim:

1. In a rotary fitting adapted to provide means for conveying fluid under pressure to and from a rotary member, the combination of a hollow housing, a fluid conduit joined thereto, a fluid path member extending into the housing separate from said fluid conduit and communicating with the space in the housing served by the fluid conduit and adapted to communicate at its outer end with the rotary member and to rotate therewith, means for sealing said fluid path member with respect to said housing including a sealing and bearing ring positioned in sealing engagement with said housing and about said fluid path member intermediate the ends thereof, a bellows member positioned in the fluid column but outside of and about said fluid path member between the inner end thereof and said sealing and bearing ring, rings fixed one at each end of said bellows member and sealed thereto, one of said rings being sealed to said fluid path member and rotatable therewith, the other of said rings being slidable on said fluid path member and in contact with said sealing and bearing ring and having a face in contact with said sealing and bearing ring in a plane perpendicular to the axis of said fluid path member and having an oppositely disposed pressure face exposed to the fluid pressure within said housing, the areas of said contact and said pressure face being of such magnitude that said other ring will be subjected to a differential pressure forcing said other ring and the sealing and bearing ring into engagement, and said bellows member comprising a sealed spring biased to exert sealing pressure upon that bellows ring which bears against said sealing and bearing ring and being so constructed as to have a tendency to collapse under excessive exterior pressure.

2. In a self contained rotary fitting adapted to provide means for conveying fluid under pressure to and from a rotary member, the combination of a hollow housing, a fluid conduit communicating therewith, a fluid path member extending into said housing separate from said fluid conduit and communicating with the space in the housing served by the fluid conduit, said fluid path member being rotatable in the housing and having a first end adjacent the fluid conduit and a second end adapted to communicate with the rotary member, means for sealing said fluid path member with respect to said housing including a sealing and bearing ring fixed against rotation in said housing and extending around said fluid path member intermediate the ends thereof, means sealing the sealing and bearing ring in said housing, a bellows member positioned in the fluid column but outside of and about said fluid path member between the first end thereof and said sealing and bearing ring, rings fixed one at each end of said bellows member and sealed thereto, one of said rings being sealed to said fluid path member adjacent the first end thereof and rotatable therewith, the other of said rings having a face in axial contact with said sealing and bearing ring and having an oppositely disposed pressure face exposed to the fluid pressure within said housing, the areas of said contact and said pressure face being of such magnitude that said other ring will be subjected to a differential pressure forcing said other ring and the sealing and bearing ring into engagement, and said bellows member comprising a sealed spring biased to exert sealing pressure upon that bellows ring which bears against said sealing and bearing ring.

3. In a rotary connection adapted to provide means for introducing fluid under pressure to a rotary member, the combination of a hollow housing, a fluid conduit communicating therewith, a rotatable fluid path member extending into said housing separate from said fluid conduit and communicating with the space in the housing served by the fluid conduit, said fluid path member being rotatable in said housing and having an inner end adjacent the fluid conduit and an outer end adapted to communicate with the rotary member, means for sealing said fluid path member with respect to said housing including a sealing and bearing ring sealed in said housing and extending about and in contact with said fluid path member intermediate the ends thereof, a bellows member positioned in the fluid column but outside of and about said fluid path member between the inner end thereof and said sealing and bearing ring, a first bellows ring sealed to one end of said bellows and fixed to said fluid path member adjacent the inner end thereof and rotatable therewith, a second bellows ring sealed to the end of said bellows adjacent said sealing and bearing ring and slidable on said fluid path member, said sealing and bearing ring being chamfered adjacent said second bellows ring providing an annular raised planar face portion, said second bellows ring having a face in contact with the raised planar face portion of the sealing and bearing ring in a plane perpendicular to the axis of said fluid path member and having an oppositely disposed pressure face exposed to the fluid pressure within said housing, the areas of said contact and said pressure face being of such magnitude that said second bellows ring will be subjected to a differential pressure forcing said second bellows ring and the sealing and bearing ring into engagement, and said bellows member comprising a sealed spring biased to exert sealing pressure upon the second bellows ring which bears against said bearing and sealing ring.

4. In a rotary fitting adapted to provide means for conveying fluid under pressure to a rotary member, the combination of a hollow housing, at least one fluid conduit joined thereto for conveying fluid thereinto and therefrom, a fluid path member extending into and rotatably mounted in said housing separate from said fluid conduit and communicating with the space in the housing served by the fluid conduit, said fluid path member having an inner end adjacent the fluid conduit and an outer end adapted to communicate with the rotary member and to rotate therewith, means for sealing said fluid path member with respect to said housing including a sealing and bearing ring sealed in said housing and about said fluid path member between the inner and outer ends of said fluid path member, a metallic bellows member positioned outside of and about said fluid path member between the inner end thereof and said sealing and bearing ring, means sealing one end of said bellows member to said fluid path member for rotation therewith, a ring sealed to the other end of said bellows and slidable on said fluid path member and being in contact with said sealing and bearing ring, said last-named ring having a face in contact with said sealing and bearing ring in a plane substantially perpendicular to the axis of said fluid path member and having an oppositely disposed pressure face exposed to fluid pressure within said housing, said bellows member comprising a sealed spring biased to exert sealing pressure upon the ring which bears against said sealing and bearing ring, said bellows being so constructed as to tend to collapse under excessive exterior pressure, and the areas of the contact face and pressure face on said last-named ring being of such magnitude that said ring will be subjected to differential fluid pressure forcing said ring into engagement with the sealing and bearing ring and overcoming the tendency of the bellows to collapse.

HARMON L. SHAW.

References Cited in the file of this patent

UNITED STATES PATENTS

| Number | Name | Date |
|---|---|---|
| 1,163,995 | Frank | Dec. 14, 1915 |
| 1,535,219 | Fulton | Apr. 28, 1925 |
| 1,763,574 | Williams | June 10, 1930 |
| 2,038,855 | Rosenbald | Apr. 28, 1936 |
| 2,077,954 | Ramclow | Apr. 20, 1937 |
| 2,108,701 | Amberg | Feb. 15, 1938 |
| 2,264,983 | Karlberg | Dec. 2, 1941 |
| 2,297,094 | Armstrong et al. | Sept. 29, 1942 |
| 2,326,217 | Hart | Aug. 10, 1943 |
| 2,331,615 | Meyer | Oct. 12, 1943 |
| 2,384,281 | Carter | Sept. 4, 1945 |
| 2,402,224 | Hornbostel | June 18, 1946 |
| 2,407,745 | Jacobson | Sept. 17, 1946 |
| 2,447,663 | Payne | Aug. 24, 1948 |
| 2,496,471 | Hornbostel | Feb. 7, 1950 |
| 2,511,495 | Croth | June 13, 1950 |
| 2,598,484 | Adams | May 27, 1952 |